United States Patent [19]

Harrison et al.

[11] Patent Number: 5,051,393

[45] Date of Patent: Sep. 24, 1991

[54] VEHICLE EXHAUST GAS CATALYSTS

[75] Inventors: Philip G. Harrison, Colston Bassett; Peter J. F. Harris, Wantage, both of Great Britain

[73] Assignee: TI Corporate Services Limited, London, England

[21] Appl. No.: 399,523

[22] PCT Filed: Feb. 8, 1989

[86] PCT No.: PCT/GB89/00120

§ 371 Date: Dec. 8, 1989

§ 102(e) Date: Dec. 8, 1989

[87] PCT Pub. No.: WO89/07005

PCT Pub. Date: Aug. 10, 1989

[30] Foreign Application Priority Data

Feb. 8, 1988 [GB] United Kingdom ............... 8802780

[51] Int. Cl.$^5$ .................. B01J 21/04; B01J 23/10; B01J 23/14; B01J 23/22; B01J 23/26; B01J 23/72; B01J 23/82; B01J 23/86

[52] U.S. Cl. .................. 502/304; 502/310; 423/213.2

[58] Field of Search .................. 502/310, 318, 304; 423/213.2

[56] References Cited

U.S. PATENT DOCUMENTS

| | | | |
|---|---|---|---|
| 3,839,224 | 10/1974 | Yonehara et al. | 502/66 |
| 3,951,867 | 4/1976 | Howell | 252/462 |
| 4,003,978 | 1/1977 | Shiraishi et al. | 423/237 |
| 4,208,537 | 6/1980 | Kawamata et al. | 568/804 |
| 4,524,051 | 6/1985 | Wright et al. | 423/247 |
| 4,814,153 | 3/1989 | Kobayashi et al. | 423/213.2 |
| 4,908,192 | 3/1990 | Harrison et al. | 423/213.2 |

FOREIGN PATENT DOCUMENTS

| | | | |
|---|---|---|---|
| 1578433 | 8/1969 | France | 502/310 |
| 47-07763 | 4/1972 | Japan . | |
| 126561 | 1/1974 | Japan . | |
| 108169 | 8/1975 | Japan . | |
| 108666 | 9/1976 | Japan . | |
| 736997 | 6/1970 | U.S.S.R. . | |
| 691185 | 8/1977 | U.S.S.R. . | |
| 1476347 | 6/1977 | United Kingdom . | |
| 2070958 | 9/1981 | United Kingdom . | |
| 2155915 | 10/1985 | United Kingdom . | |

OTHER PUBLICATIONS

An abstract of the above Japanese Patent was submitted by applicants.

"The Catalytic Reduction of Nitrous Oxide by Carbon Monoxide over TinIV Oxide", M. J. Fuller et al., 11/11/75, vol. 39, pp. 412–418.

"Catalysis of the NO–CO Reaction: A Further Example of Synergism in the PD–SNO Systems"; Martin J. Fuller, 1976, pp. 787–788.

Water Promoted Oxidation of Carbon Monoxide over Tin IV Oxide Supported Palladium; E. Hincks et al., 10/13/77, vol. 269, pp. 585–586.

Adsorptions Reduction of NO on Tin IV Oxide Doped with Chromium III Oxide, F. Solymosi et al., 11/1/77, pp. 42–51.

"Oxidation of Ethylene Oxide and Propylene on $SnO_2O$–$Cr_2O_3$" Bozso, F., Symposium on the Mechanisms of Hydrocarbon Reactions 7/73, pp. 311–320.

Chemical Abstracts, VI. 91, 1979 Abstract No. 97262b, "The Preparation and Activation of Tin IV Oxide–Chromium III Oxide Catalyst".

Chemical Abstracts, vol. 81, 1974, Abstract No. 175627j, "Removing Nitrogen Oxides from Waste or Exhaust Gases by Contacting with Amonia in the Prescence of Tin Oxide of Cerium Oxide";

"The Catalytic Reduction of Nitric Oxide by Carbon Monoxide $SnO_2$ CuO Gels"; J. J. Fuller et al.; 8/4/75; vol. 42, pp. 418–424.

Primary Examiner—W. J. Shine
Attorney, Agent, or Firm—Shlesinger Arkwright & Garvey

[57] ABSTRACT

A method for the catalytic oxidation of carbon monoxide and unburnt hydrocarbon components of vehicle exhaust gas streams is disclosed. The method comprises using as the catalyst a mixed oxide catalyst composition consisting essentially of tin (IV) oxide ($SnO_2$), chromium (VI) oxide ($CrO_3$) and copper (II) oxide (CuO) free from platinum and other noble metals or noble metal oxides, and containing an Sn:Cr weight ratio (calculated as $SnO_2:CrO_3$) in the range 99:1 to 1:99, and copper (II) oxide (CuO) in an amount of from 0.5 to 100% by weight, based on the combined weight of $SnO_2$ and $CrO_3$. The catalyst composition having been prepared by impregnating tin(IV) oxide ($SnO_2$) with chromium(VI) oxide ($CrO_3$) and copper oxide (CuO) and calcining the resulting product.

16 Claims, No Drawings

VEHICLE EXHAUST GAS CATALYSTS

This invention relates to catalyst compositions for use primarily as vehicle exhaust gas catalysts, to control the emissions of noxious gases, particularly carbon monoxide, unburnt hydrocarbons and/or nitrogen oxides, but also having utility in other fields where similar emission control is necessary.

Catalytic converters currently in use in motor vehicles to control exhaust gas emissions generally comprise one or more platinum group metals, e.g. platinum, palladium, rhodium or rhenium, alone or in combination, and thus tend to be expensive. The most commonly used catalytic material is platinum on alumina. Much research has been carried out to find a less expensive alternative, and one system that has received considerable attention is the $SnO_2$-$Cr_2O_3$ system. For example, in a series of papers:

J. Catal. 41, 202 (1976);
J. Chem. Soc. Chem. Commun. 509-510 (1974);
Preparation of Catalysts, Ed. B. Delmon et al, Elsevier Scientific
Publishing Company, 197-206 (1976);
J. Catal. 54, 42-51 (1978);

F. Solymosi et al have reported that $SnO_2$ doped with a small amount (0.1-1 mole %) of $Cr_2O_3$ is a very active catalyst for the adsorption and reduction of nitric oxide (NO) at low temperatures (150°-400° C.) in the presence of a reducing gas such as CO, $H_2$ or $C_2H_4$. The catalyst is prepared by reacting $HNO_3$ with metallic tin to produce $SnO_2$ which is recovered, dried at 120° C. and further heated at 350° C. for 3 hours and 500° C. for a further five hours. The $SnO_2$ is then suspended in water and $Cr_2O_3$ added to the suspension with continuous stirring over a long period until a homogenous dispersion is obtained. The suspension is then dried, heated at 350° C. for 5 hours and finally calcined in air at 900° C. for 5 hours. As a result an $SnO_2$ catalyst is obtained having higher valency chromium ions (average valency 3.85) stabilised in the surface layer.

$SnO_2$-$Cr_2O_3$ catalysts are also reported to be effective catalysts for the catalytic oxidation of CO in gaseous mixtures containing $SO_2$ (USSR Patent No. 736,997); catalytic removal of $SO_2$ (USSR Patent No. 691,185); catalytic reduction of nitrogen oxides in the presence of $NH_3$ (Japanese published patent application No. 75-108169); and as alkylation catalysts in the alkylation of phenols (U.S. Pat. No. 4,208,537). In USSR Patent 736,997 such $SnO_2$-$Cr_2O_3$ catalysts are prepared by heating $SnCl_2$ and $CrO_3$ in relative proportions to give $SnO_2$:$Cr_2O_3$ mole % ratios of from 1:99 to 99:1. In Japanese published patent application 75-108169, the $SnO_2$-$Cr_2O_3$ catalysts are prepared by coprecipitation from an aqueous solution containing concentrated HCl, $CrO_3$ and $SnCl_2.2H_2O$ by addition of $NH_4OH$. The mixed oxide precipitated was recovered, slurried in water, coated onto an alumina support, dried and calcined. In U.S. Pat. No. 4,208,537, the $SnO_2$-$Cr_2O_3$ containing alkylation catalysts are prepared by coprecipitation, or kneading preformed $SnO_2$ and $Cr_2O_3$-containing gels to form an oxide mixture and calcining, optionally after coating onto a suitable, e.g. alumina, support.

More recently it has been found (published UK Patent Application No. 2,194,174) that catalyst compositions having high levels of catalytic activity in the oxidation of CO and unburnt hydrocarbons, and in the catalytic reduction of nitrogen oxides, equivalent in many cases to those of precious metal catalysts and therefore potentially useful as vehicle exhaust gas catalysts for the control of noxious emissions, are obtained by impregnating tin(IV) oxide ($SnO_2$) with chromium(VI) oxide ($CrO_3$) and calcining the resulting product. For convenience the catalyst may be regarded as a mixed $SnO_2$:$CrO_3$ catalyst. In such catalysts the tin:chromium weight ratio (calculated as $SnO_2$:$CrO_3$) may be in the range 99:1 to 1:99, but is preferably in the range 24:1 to 2:3, most preferably 4:1 to 2:3.

The $SnO_2$:$CrO_3$ catalyst composition is preferably obtained by impregnating tin(IV) oxide, preferably uniformly dispersed on a high surface area ceramic support such as cordierite, and deposited thereon by the sol-gel process described by the United Kingdom Atomic Energy Authority in their UK Patent GB 2,134,004 B, with aqueous chromic acid, drying and calcining the resulting product. At an $SnO_2$:$CrO_3$ weight ratio of 70:30 such a catalyst gives substantially complete CO and hydrocarbon conversions at temperatures in the range 200° to 300° C., and substantially complete NO reduction at the same temperature.

In accordance with the present invention, it has been found that the performance of such $SnO_2$:$CrO_3$ catalyst compositions can be improved still further, particularly with regard to their CO oxidation activity, by incorporating CuO into the catalyst.

The CuO may be incorporated into the catalyst preparation in any convenient manner. Usually this will comprise impregnating the catalyst support, before or after deposition of tin(IV) oxide and/or chromium(VI) oxide, or directly impregnating the tin(IV) oxide if no support is used, with CuO or with a suitable precursor material convertible to CuO upon calcination. Preferably the CuO is incorporated into the support (or directly into the $SnO_2$ if no support is used) by impregnating the support, before or after incorporating the $SnO_2$ and/or $CrO_3$, or simultaneously therewith, with an aqueous solution of a water-soluble copper salt, such as cupric nitrate, convertible to the oxide CuO on calcination, or with aqueous cupric hydroxide, followed by drying and calcination of the impregnated support.

The CuO may be incorporated into the catalyst preparation in amounts ranging from 0.5 to 100% by weight or more, based on the combined weight of $SnO_2$ and $CrO_3$; preferably the amount of CuO will be in the range 5 to 80% by weight, more preferably 10 to 70%, based on the combined weight of $SnO_2$ and $CrO_3$.

In accordance with one aspect of this invention, therefore, there is provided a mixed non-precious metal oxide catalyst composition, having catalytic activity in the catalytic oxidation of CO and unburnt hydrocarbons and/or the catalytic reduction of nitrogen oxides, and comprising a combination of tin(IV) oxide, chromium(VI) oxide and CuO. By "mixed oxide catalyst" is meant not only physical mixtures of the specified oxides, but also, and in fact usually, the specified oxides in chemical combination one with the other, the combination being regardable as a combination of the oxides $SnO_2$:$CrO_3$:CuO in varying proportions.

The tin: chromium rate weight ratio (calculated as $SnO_2$:$CrO_3$) may be in the range of 99:1 to 1:99, but is preferably in the range of 24:1 to 2:3, and more preferably 4:1 to 2:3.

Preferably such catalyst compositions are provided in supported form, i.e. supported upon a suitable catalyst support, such as alumina, silica, titania, etc., and preferably upon a high surface area, monolithic ceramic support such as cordierite.

In accordance with a further aspect of the present invention, further catalytically active metal oxides may be incorporated into the catalyst composition selected from ceric oxide $CeO_2$, aluminum oxide $Al_2O_3$, ferric oxide $Fe_2O_3$ and vanadium pentoxide $V_2O_5$. Particularly preferred additions are $CeO_2$ and/or $Al_2O_3$. In accordance with this further aspect, therefore, there are provided, in accordance with this invention, mixed non-precious metal oxide, as hereinbefore defined, catalyst compositions, having catalytic activity in the catalytic oxidation of CO and unburnt hydrocarbons and/or the catalytic reduction of nitrogen oxides, and comprising a combination of tin(IV) oxide, chromium(VI) oxide, copper oxide (CuO) and one or more of ceric oxide ($CeO_2$), aluminium oxide ($Al_2O_3$), ferric oxide ($Fe_2O_3$) and vanadium pentoxide ($V_2O_5$).

The additional oxide or oxides may be incorporated into the catalyst composition in a similar manner, that is to say by impregnating the support (or the $SnO_2$ where no support is used) with a precursor material convertible to the desired oxide upon calcination, and preferably a water-soluble precursor which is incorporated into the support (or directly into the $SnO_2$) by impregnating with an aqueous solution of the precursor material followed by drying and calcining. Most desirably and wherever possible the additional oxide(s) are incorporated into the support (or directly into the $SnO_2$) by a sol-gel process, i.e. by impregnating the support (or the $SnO_2$) with a suitable oxide sol, followed by drying and calcining. In general, the oxides may be incorporated into the support in any order. As before, the preferred supports are high surface area supports such as alumina, silica, titania, etc., most preferably monolithic ceramic supports such as cordierite.

The amounts of the additional oxide(s) may range from 0.5 to 50% by weight, based on the combined weights of $SnO_2$ and $CrO_3$: more probably, individual amounts of the additional oxide(s) may range from 1 to 40%, most probably in the range 10 to 30%, based on the combined weight of $SnO_2$ and $CrO_3$.

Also provided in accordance with this invention are catalytic converters for the control of vehicle exhaust gas emissions and comprising a mixed non-precious metal oxide catalyst composition as above described, preferably in supported form.

The preparation and activity of mixed oxide catalyst compositions in accordance with this invention, in powder form, are illustrated by the following Example.

EXAMPLE 5 mls of an aqueous sol containing 282 g $SnO_2$ per liter was pipetted into a petri dish. To this was added with stirring 2.115 mls of a solution containing 10 g $CrO_3$ in 50 mls water. To this mixture was then added 2.115 mls of a solution containing 30.37 g $Cu(No_3)_2.3H_2O$ in 50 mls water. This was thoroughly mixed with a glass rod and then placed in an oven at 100° C. to dry. When dry the mixture was ground, placed in a silica crucible and fired at 400° C. for 2 hours to produce the powdered sample.

The resulting powdered mixed oxide composition had a composition corresponding to $SnO_2:CrO_3:CuO$ in the weight ratio 62:19:19. By similar techniques and altering the amount of copper added, compositions were prepared having $SnO_2:CrO_3:CuO$ ratios respectively of 51:33:16 and 43:43:13.

The catalytic activity of the powder samples was tested for CO oxidation at 200° C. and propane oxidation at 300° C., and the results compared with an unsupported $SnO_2:CrO_3$ catalyst powder prepared in a similar manner and having a $SnO_2:CrO_3$ ratio of 77:23. Tests were carried out using gaseous mixtures containing either CO (0.45 vol %) $O_2$ (20 vol %) balance $N_2$ or $SnC_3H_8$ (0.23 vol %) $O_2$ (20 vol %) balance $N_2$ under continuous flow conditions at flow rates of 0.52 L/m and 0.13 L/m respectively. CO contents of the treated gas streams were determined by infra-red analysis, hydrocarbon content by a flame ionisation detector.

| (a) Specific Activities of $SnO_2:CrO_3:CuO$ Samples CO and $C_3H_8$ oxidation at 300° C. | | |
|---|---|---|
| | Catalyst Activity | |
| $SnO_2:CrO_3:CuO$ | moles converted/g catalyst/hr | |
| Ratio | CO | $C_3H_8$ |
| 62:19:19 | 0.43 | $5.9 \times 10^{-3}$ |
| 51:33:16 | 0.37 | $5.8 \times 10^{-3}$ |
| 43:43:13 | 0.29 | $3.2 \times 10^{-3}$ |

| (b) $SnO_2:CrO_3:CuO$ Powders $T_{100}$ values for CO oxidation (0.5 g samples) | |
|---|---|
| $SnO_2:CrO_3:CuO$ Ratio | Temperature to remove CO completely, $T_{100}$ |
| 62:19:19 | 175° |
| 51:33:16 | 195° |
| 43:43:13 | 185° |

Using the 62:19:19 ratio composition complete CO oxidation is achieved at 175° C. Comparable figure for complete CO removal using a $SnO_2:CrO_3$ catalyst, weight ratio 77:23 is 340° C.

Whilst these figures show a decreased, but still acceptable propane oxidation activity as compared with the $SnO_2:CrO_3$ catalyst, they also show a substantial improvement in CO oxidation activity brought about by the addition of CuO.

Other specific ratios of $SnO_2$ and $CrO_3$ effective in catalyst compositions according to this invention are

| $SnO_2:CrO_3$ Wt. Ratio | $T_{100}{}^a$ (CO) | $T_{100}{}^b$ ($C_3H_8$) | Specific Activities$^c$ | |
|---|---|---|---|---|
| | | | (CO) | ($C_3H_8$) |
| 100:1 (Comparison, pure $SnO_2$) | 360 | 525 | 0.06 | 0 |
| 96:4 | 330 | 460 | | |
| 93.5:6.5 | 330 | 410 | | |
| 88:12 | 350 | 400 | | |
| 80:20 | 240 | 320 | | |
| 77:23 | 250 | 280 | 0.072 | $8.4 \times 10^{-3}$ |
| 71:29 | 310 | 300 | | |
| 67:33 | 340 | 320 | | |
| 62.5:37.5 | 330 | 280 | | |
| 50:50 | 250 | 250 | 0.048 | $10 \times 10^{-3}$ |
| 40:60 | 320 | 300 | | |

Footnotes:
$^a T_{100}$ (CO) temperature in °C. to obtain 100% conversion of CO in a mixed gas stream containing CO - 4 to 8 vol % $O_2$ - 4 to 8 vol % $N_2$ - balance at a flow rate of from 0.1 to 0.5 l/min.
$^b T_{100}$ ($C_3H_8$) temperature in °C. required to obtain 100% conversion of n-propane in a gas stream containing $C_3H_8$ - 0.1 to 0.5 vol % $O_2$ - 10 to 20 vol % $N_2$ - balance at a flow rate of from 0.1 to 0.5 l/min.
$^c$Specific activity moles of CO (or $C_3H_8$) converted/g catalyst/hr at 300° C.

Additions of CuO to the above compositions in amounts of from 0.5 to 100% by weight, preferably 5 to 80%, based on the combined weights of $SnO_2$ and $CrO_3$ show substantial reductions in the $T_{100}$ figures, particularly for CO, and a substantial increase in the level of specific activity. As indicated by the figures given, $T_{100}$(CO) values are reduced to below 200° C., down in one case to as low as 175° C. Specific activity levels show a three-fold increase to levels in excess of 0.25 moles of CO converted/g catalyst/hr, and in one case as high as 0.43. These figures demonstrate the substantial increase in activity of the catalyst compositions of the present invention, particularly with reference to CO oxidation, obtained by adding CuO to the $SnO_2/CrO_3$ mixture.

We claim:

1. A mixed oxide catalyst composition for the catalytic oxidation of carbon monoxide and unburnt hydrocarbon components of vehicle exhaust gas streams, consisting essentially of:
   a) mixed oxides of tin (IV) oxide ($SnO_2$), chromium (VI) oxide ($CrO_3$), and copper (II) oxide (CuO) free from platinum and other noble metals or noble metal oxides;
   b) wherein $SnO_2:CrO_3$ is provided in a weight ratio in the range 99:1 to 1:99, and CuO is provided at a level from 0.5 to 100% by weight, based on the combined weight of $SnO_2:CrO_3$.

2. The composition of claim 1, wherein the $SnO_2:CrO_3$ weight ratio is in the range 24:1 to 2:3.

3. The composition of claim 2, wherein the $SnO_2:CrO_3$ weight ratio is in the range 4:1 to 2:3.

4. The composition of claim 1, wherein the CuO content, relative to the tin and chromium oxides, is from 5 to 80%, based on the combined weights of $SnO_2$ and $CrO_3$.

5. The composition of claim 1, including a high surface area refractory catalyst support.

6. The composition of claim 5, wherein the catalyst support is a ceramic monolith.

7. The composition of claim 1, wherein:
   a) the mixed oxide catalyst composition further includes one or more oxides selected from the group consisting of vanadium pentoxide ($V_2O_5$), ceric oxide ($CeO_2$), aluminum oxide ($Al_2O_3$) and ferric oxide ($Fe_2O_3$) in a total amount of from 0.5 to 50% by weight, based on the combined weight of $SnO_2$ and $CrO_3$.

8. A catalyst composition for the catalytic oxidation of carbon monoxide and unburnt hydrocarbon components of vehicle exhaust gas streams, obtained by calcining a mixture consisting essentially of:
   a) tin (IV) oxide ($SnO_2$), chromium (VI) oxide ($CrO_3$), and a suitable precursor material convertible to copper (II) oxide (CuO) upon calcination free from platinum and other noble metals or noble metal oxides; and
   b) the mixture comprising $SnO_2$ and $CrO_3$ in a weight ratio in the range 99:1 to 1:99; and
   c) the copper (II) oxide (CuO), after calcination, being present at a level from 0.5 to 100% by weight, based on the combined weight of $SnO_2$ and $CrO_3$.

9. The composition of claim 8, wherein:
   a) the mixture further includes a suitable precursor material convertible upon calcination to an oxide selected from the group consisting of vanadium pentoxide ($V_2O_5$), ceric oxide ($CeO_2$), aluminum oxide ($Al_2O_3$) and ferric oxide ($Fe_2O_3$); and
   b) the selected oxide, after calcination, being present at a level from 0.5 to 50% by weight, based on the combined weight of $SnO_2$ and $CrO_3$.

10. The composition of claim 9, wherein:
    a) the selected oxide, after calcination, is present at a level from 1 to 40%, based on the combined weight of $SnO_2$ and $CrO_3$.

11. The composition of claim 9, wherein:
    a) the selected oxide, after calcination, is present at a level from 10 to 30%, based on the combined weight of $SnO_2$ and $CrO_3$.

12. The composition of claim 8, wherein:
    a) the $SnO_2:CrO_3$ weight ratio is in the range 24:1 to 2:3.

13. The composition of claim 8, wherein:
    a) the $SnO_2:CrO_3$ weight ratio is in the range 4:1 to 2:3.

14. The composition of claim 8, wherein:
    a) the Copper (II) oxide (CuO) is present at a level from 5 to 80% based on the combined weight of $SnO_2$ and $CrO_3$.

15. The composition of claim 8, wherein:
    a) the catalyst comprises a high surface area refractory catalyst support.

16. The composition of claim 15, wherein:
    a) the catalyst support comprises a ceramic monolith.

* * * * *